(12) United States Patent
Yasuda

(10) Patent No.: US 10,009,499 B2
(45) Date of Patent: Jun. 26, 2018

(54) INFORMATION PROCESSING SYSTEM AND IMAGE FORMING APPARATUS

(71) Applicant: Sayaka Yasuda, Kanagawa (JP)

(72) Inventor: Sayaka Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/630,074

(22) Filed: Jun. 22, 2017

(65) Prior Publication Data

US 2018/0027141 A1  Jan. 25, 2018

(30) Foreign Application Priority Data

Jul. 19, 2016 (JP) ................. 2016-141429

(51) Int. Cl.
*H04N 1/00* (2006.01)
*H04N 1/44* (2006.01)

(52) U.S. Cl.
CPC ..... *H04N 1/00941* (2013.01); *H04N 1/00952* (2013.01); *H04N 1/00954* (2013.01); *H04N 1/4433* (2013.01); *H04N 2201/0094* (2013.01)

(58) Field of Classification Search
CPC ........... H04N 1/00941; H04N 1/00952; H04N 1/4433; H04N 1/00954; H04N 2201/0094
USPC ....................................... 358/1.15
See application file for complete search history.

(56) References Cited

U.S. PATENT DOCUMENTS

| | | | | |
|---|---|---|---|---|
| 8,683,580 B2 * | 3/2014 | Shimizu | ................ | G06F 21/608 380/247 |
| 2012/0192257 A1 * | 7/2012 | Ishii | ................... | H04N 1/00244 726/7 |
| 2012/0307287 A1 * | 12/2012 | Motosugi | ............... | G06K 15/00 358/1.14 |
| 2016/0360346 A1 | 12/2016 | Nagata | | |
| 2016/0370979 A1 | 12/2016 | Maeda | | |
| 2017/0039077 A1 | 2/2017 | Kubota | | |
| 2017/0063875 A1 | 3/2017 | Yanase | | |
| 2017/0078504 A1 | 3/2017 | Nagata | | |

FOREIGN PATENT DOCUMENTS

| | | |
|---|---|---|
| JP | 2009-272810 | 11/2009 |
| JP | 2015-176531 | 10/2015 |

\* cited by examiner

*Primary Examiner* — Allen H Nguyen
(74) *Attorney, Agent, or Firm* — Harness, Dickey & Pierce, P.L.C.

(57) ABSTRACT

An information processing system includes a processor and a memory that stores a plurality of instructions which cause the processors to control executing a first application executed on an operation unit including a display, acquire identification information for identifying the first application in accordance with execution of the first application, register the identification information being acquired in the memory, control executing a second application executed on a main unit controlling the information processing system to perform multiple functions according to an instruction input to the operation unit, output, in response to receiving a request to log out while the second application is executing, rejection information indicating that the request to log out is rejected, and control, in response to outputting the rejection information, the display of the operation unit to display first name information indicating a name of the first application corresponding to the identification information registered in the memory.

6 Claims, 10 Drawing Sheets

| APP ID INSTALLED IN OPERATION UNIT |
|---|
| OAP0001 |
| ⋮ |

INFORMATION PROCESSING SYSTEM AND IMAGE FORMING APPARATUS

CROSS-REFERENCE TO RELATED APPLICATION

This patent application is based on and claims priority pursuant to 35 U.S.C. § 119(a) to Japanese Patent Application No. 2016-141429, filed on Jul. 19, 2016 in the Japan Patent Office, the entire disclosure of which is hereby incorporated by reference herein.

BACKGROUND

Technical Field

The present invention relates to an information processing system and an image forming apparatus.

Background Art

A technology that displays user interfaces (UIs) used for commanding to perform functions provided by applications installed in an apparatus is known. In this case, a user operates a touch panel etc., logs in the apparatus, and selects the UI corresponding to the function that the user intends to use. Subsequently, the apparatus performs the function corresponding to the selected UI. In the apparatuses described above, in case of performing the function while the user is logging in, a technology that controls the apparatus to prevent the user from logging out is known. A message indicating that the user cannot log out is displayed on the touch panel etc. For example, in multifunction peripherals (MFPs), in accordance with a content and status of an unfinished job, a technology that does not allow to log out by user operation and reports that an unfinished job is remaining in case of detecting that the unfinished job in the state of being unable to log out is remaining is known.

SUMMARY

Example embodiments of the present invention provide a novel information processing system that includes a processor and a memory that stores a plurality of instructions which, when executed by one or more processors, cause the processors to control executing a first application executed on an operation unit, the operation unit including a display, acquire identification information for identifying the first application in accordance with execution of the first application, register the identification information being acquired in the memory, control executing a second application executed on a main unit, the main unit controlling the information processing system to perform multiple functions according to an instruction input to the operation unit, output, in response to receiving a request to log out while the second application is executing, rejection information indicating that the request to log out is rejected, and control, in response to outputting the rejection information, the display of the operation unit to display first name information indicating a name of the first application corresponding to the identification information registered in the memory.

Further example embodiments of the present invention provide an image forming apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

Figure 1:
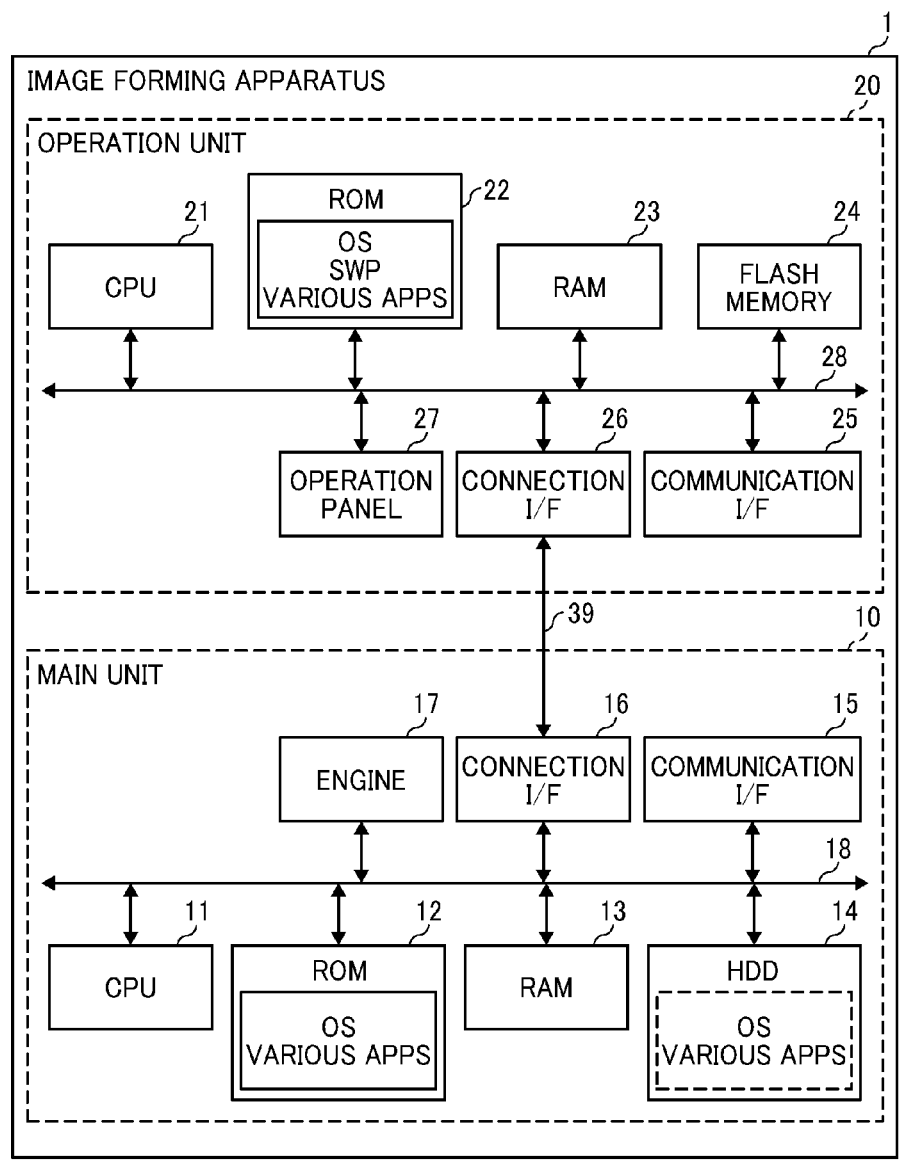
FIG. 1 is a block diagram illustrating a hardware configuration of an image forming apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

Exemplary embodiments of this disclosure are now described below with reference to the accompanying drawings. In the below description, an image forming apparatus as a multifunctional peripheral (MFP) is taken as an example of an information processing system. Here, the MFP is an apparatus that includes at least two functions among a copy function, scan function (scanner function), facsimile function, and print function.

Embodiment 1

A hardware configuration of an image forming apparatus 1 in this embodiment is described below with reference to FIG. 1. FIG. 1 is a block diagram illustrating the hardware configuration of the image forming apparatus 1 in this embodiment.

As illustrated in FIG. 1, the image forming apparatus 1 includes a main unit 10 that can implement various functions such as a copy function, scan function, facsimile function, and a print function etc. and an operation unit 20 that accepts various inputs by user operation. The main unit 10 is communicably connected to the operation unit 20 via a dedicated communication path 39. A communication path compatible with Universal Serial Bus (USB) standard can be used as an example of the communication path 39. In addition, any wireless and wired communication path can be used as the communication path 39. It should be noted that the main unit 10 may perform an operation in accordance with the input by user operation that the operation unit 20 accepts. In addition, the main unit 10 may communicate with an external apparatus such as a client personal computer (PC) and perform an operation in accordance with a command received from the external apparatus.

The main unit 10 includes a central processing unit (CPU) 11, a read only memory (ROM) 12, a random access memory (RAM) 13, a hard disk drive (HDD) 14, a communication I/F 15, a connection I/F 16, and an engine 17. Those components described above are connected with each other via a system bus 18.

The ROM 12 stores a copy application program (copy AP) and a scan application program (scan AP) etc. in addition to an operating system (OS) program. In addition, the ROM 12 stores a facsimile application program (fax AP) and a print application program (print AP) etc. Furthermore, the ROM 12 stores various programs. In the above description, the various programs described above are stored in the ROM 12. However, the various programs may be stored in the HDD 14.

The CPU 11 controls entire operations of the main unit 10. The CPU 11 controls the entire main unit 10 by executing a program stored in the ROM 12 and the HDD 14 etc. using the RAM 13 as a work area, to implement various functions such as the copy function, scan function, facsimile function, and print function etc. described above. The communication I/F 15 is a network interface that connects the main unit 10 to a network and communicates with external apparatuses (e.g., client PCs etc.) connected to the network. The connection I/F 16 is an interface for communicating with the operation unit 20 via the communication path 39.

The engine 17 is hardware that performs operations other than generic information processing and communication for implementing the various functions such as the copy function, scan function, facsimile function, and print function. For example, the engine 17 includes a scanner that scans an image on a document (an image scanning unit), a plotter that prints an image on a sheet material such as paper etc. (an image forming unit), and a facsimile that performs facsimile communication etc. In addition, the engine 17 may optionally include any other device such as a finisher that sorts printed sheet materials and an automatic document feeder (ADF) that feeds documents automatically (feeding documents automatically).

The operation unit 20 includes a CPU 21, a ROM 22, a RAM 23, a flash memory 24, a communication I/F 25, a connection I/F 26, and an control panel 27. Those components described above are connected with each other via a system bus 28.

By communicating with the main unit 10, the operation unit 20 performs information processing cooperating with the main unit 10. Therefore, in the operation unit 20, an OS program is stored in the ROM 22 so that the operation unit 20 may perform the information processing independently of the main unit 10. In addition, just like the ROM 12 in the main unit 10, the ROM 22 stores a copy AP, a scan AP, a fax AP, and a print AP etc. Furthermore, the ROM 22 also stores a setting widget program (SWP) that displays a widget on a home screen (corresponding to a so-called desktop screen) of the image forming apparatus 1 displayed on the control panel 27.

For example, the SWP is a program that displays configuration buttons corresponding to current setting values of various functions such as copy function and print function etc. and configuration widgets including user interfaces (UIs) such as a start button used for commanding to execute various functions etc. on the home screen. Here, the home screen is a screen displayed after booting up the image forming apparatus 1 and becomes an initial screen to be displayed to be displayed for accepting operations.

The CPU 21 controls entire operations of the operation unit 20. The CPU 21 executes a program stored in the ROM 22 and the flash memory 24 etc. using the RAM 23 as a working area. As a result, the CPU 21 controls entire operations of the operation unit 20 and implements various functions such as displaying information (image) in accordance with an input accepted by user operation. The communication I/F 25 is an interface to communicate with external apparatuses via the network such as the Internet and a local area network (LAN) etc. The connection I/F 26 is an interface for communicating with the main unit 10 via the communication path 39.

The control panel 27 is a so-called touch panel forming a touch detector constructed by transparent terminals and a liquid crystal display in one piece. The control panel 27 accepts various inputs in accordance with user's touch operations and displays various information (e.g., information in accordance with the input operation, information indicating an operating status of the image forming apparatus 1, and information indicating a configuration status etc.). In this embodiment, the control panel 27 is provided with the touch detector and the liquid crystal display. However, the configuration of the control panel 27 is not limited to that configuration. For example, an organic electroluminescence (EL) display unit may be used instead of the liquid crystal display.

In addition, the operation unit 20 may be removable from the main unit 10. While the operation unit 20 is removed from the main unit 10, the operation unit 20 communicates with the main unit 10 by using a wireless communication function.

Figure 2:
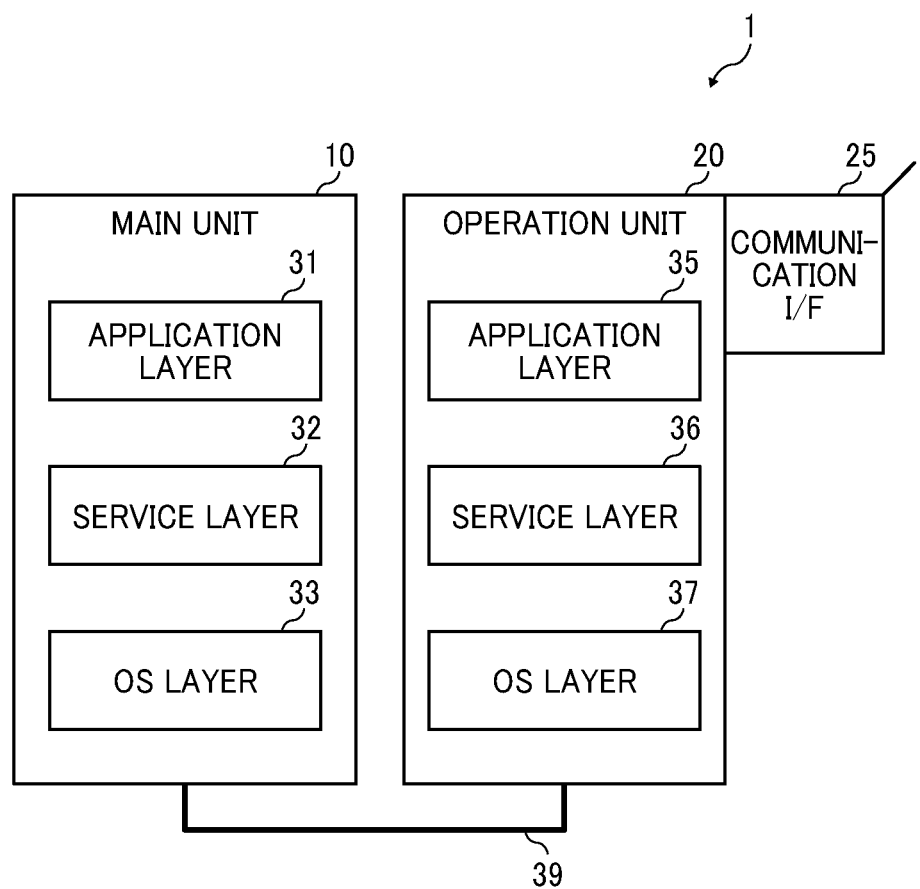
FIG. 2 is a block diagram illustrating a software configuration of the image forming apparatus as an embodiment of the present invention.

Next, a software configuration of an image forming apparatus 1 in this embodiment is described below with reference to FIG. 2. FIG. 2 is a block diagram illustrating a software configuration of the image forming apparatus 1 in this embodiment.

As illustrated in FIG. 2, the main unit 10 includes an application layer 31, a service layer 32, and an OS layer 33. Entities of the application layer 31, the service layer 32, and the OS layer 33 are various software programs stored in the ROM 12 and the HDD 14 etc. Various functions are implemented by executing these software programs by the CPU 11.

Software of the application layer 31 is an application program (AP) that provides a predetermined function by using a hardware resource. Examples of APs are the copy AP that implements the copy function, the scan AP that implements the scan function, the fax AP that implements the facsimile function, and the print AP that implements the print function etc.

Software of the service layer 32 intervenes between the application layer 31 and the OS layer 33 and provides an interface that the AP utilizes the hardware resource included in the main unit 10. More specifically, the software of the service layer 32 provides functions of accepting a request to use the hardware resource and arbitrating requests to use the hardware resource. Examples of requests that the service layer 32 accepts are scanning a document by using the scanner and printing an image by using the plotter etc.

The function of the interface by the service layer 32 is provided to not only the application layer 31 in the main unit 10 but also the application layer 35 in the operation unit 20. That is, the application layer 35 in the operation unit 20 may also implement a function that uses the hardware resource in the main unit 10 (such as the engine 17 etc.) via the interface function provided by the service layer 32.

The software of the OS layer 33 is basic software (i.e., the OS) that implements basic functions for controlling the hardware included in the main unit 10. The software of the service layer 32 converts the request to use the hardware resource transferred from the various APs into a command that the OS layer 33 may interpret and pass the command to the OS layer 33. Subsequently, by executing commands by the software of the OS layer 33, the hardware resource operates in accordance with the request transferred from the AP.

As illustrated in FIG. 2, the operation unit 20 includes an application layer 35, a service layer 36, and an OS layer 37. The layer structure of the application layer 35, the service layer 36, and the OS layer 37 included in the operation unit 20 is similar to the layer structure included in the main unit 10. However, functions provided by the APs in the application layer 35 and request types that the service layer 36 may accept are different from the main unit 10. The AP of the application layer 35 may be software to provide a predetermined function by using the hardware resource included in the operation unit 20. Mainly, the AP of the application layer 35 includes software providing UI functions for operating and displaying the functions implemented by the main unit (i.e., the copy function, the scan function, the fax function, and the print function).

As described above, the software of the OS layer 33 installed in the main unit 10 is different from the software of the OS layer 37 installed in the operation unit 20 to maintain independence of functions. That is, the main unit 10 operates independently from the operation unit 20 running on separate OSs. That is, it is possible to use Linux (registered trademark) as the software of the OS layer 33 in the main unit 10 and use Android (registered trademark) as the software of the OS layer 37 in the operation unit 20.

As described above, in the image forming apparatus 1 in this embodiment, the main unit 10 operates on the OS separate from the operation unit 20. Therefore, communication between the main unit 10 and the operation unit 20 is performed not as interprocess communication within a common apparatus but as communication between different apparatuses. An operation of passing input (content of command input by user operation) accepted by the operation unit 20 to the main unit 10 (i.e., command communication) and an operation that the main unit 10 reports an event to the operation unit 20 are respectively performed through the communication between different apparatuses. In this case, it is possible to use the function in the main unit 10 by performing command communication from the operation unit 20 to the main unit 10. Examples of the event reported to the operation unit 20 from the main unit 10 are an execution status of an operation in the main unit and a setting value configured by the main unit 10 etc.

Figure 3:
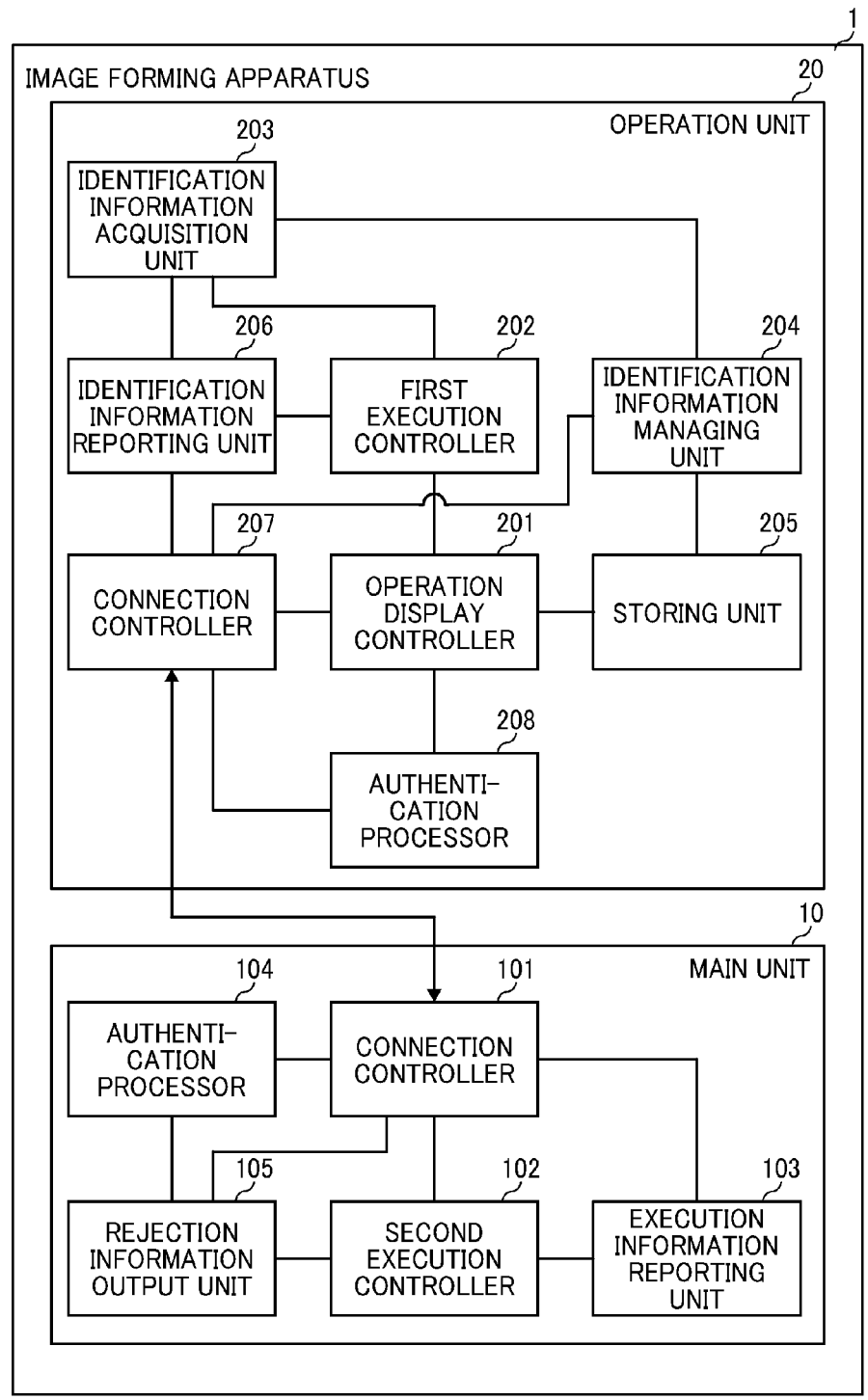
FIG. 3 is a block diagram illustrating a functional configuration of the image forming apparatus as an embodiment of the present invention.

Next, a functional configuration of the image forming apparatus 1 in this embodiment is described below with reference to FIG. 3. FIG. 3 is a block diagram illustrating a functional configuration of the image forming apparatus 1 in this embodiment.

As illustrated in FIG. 3, the image forming apparatus 1 includes the main unit 10 and the operation unit 20. Among them, the operation unit 20 includes an operation display controller 201, a first execution controller 202, an identification information acquisition unit 203, an identification information managing unit 204, a storing unit 205, an identification information reporting unit 206, a connection controller 207, and an authentication processor 208. A part or all of the components other than the storing unit 205 described above may be implemented by using software (program) or a hardware circuit.

The operation display controller 201 controls operation input and display output on the control panel 27. The operation display controller 201 corresponds to a display controller. More specifically, the operation display controller 201 accepts input such as login and logout by user operation of the image forming apparatus 1 and input for using various functions (various applications) implemented in the image forming apparatus 1 and controls display output of various information in response to the input. The operation performed by the operation display controller 201 is described below in detail.

The first execution controller 202 controls executing a first application indicating an application executed on the operation unit 20. More specifically, if a request to execute an application is accepted by the operation display controller 201, the first execution controller 202 controls executing the first application executed on the operation unit 20 among the accepted requests to execute.

The identification information acquisition unit 203 acquires identification information that identifies the first application in accordance with the execution of the first application. More specifically, if the first execution controller 202 controls executing the first application, the identification information acquisition unit 203 acquires identification information that identifies the first application. Hereinafter, the identification information for identifying the first application is referred to as "app ID on the operation unit 20" in some cases.

The identification information managing unit 204 registers the identification information in the storing unit 205. More specifically, the identification information managing unit 204 registers the app ID on the operation unit 20 acquired by the identification information acquisition unit 203 in the storing unit 205. That is, if the first application is executed on the operation unit 20, the identification information managing unit 204 registers the app ID on the operation unit 20 as the identification information of the executed first application in the storing unit 205.

Figures 4, 5:
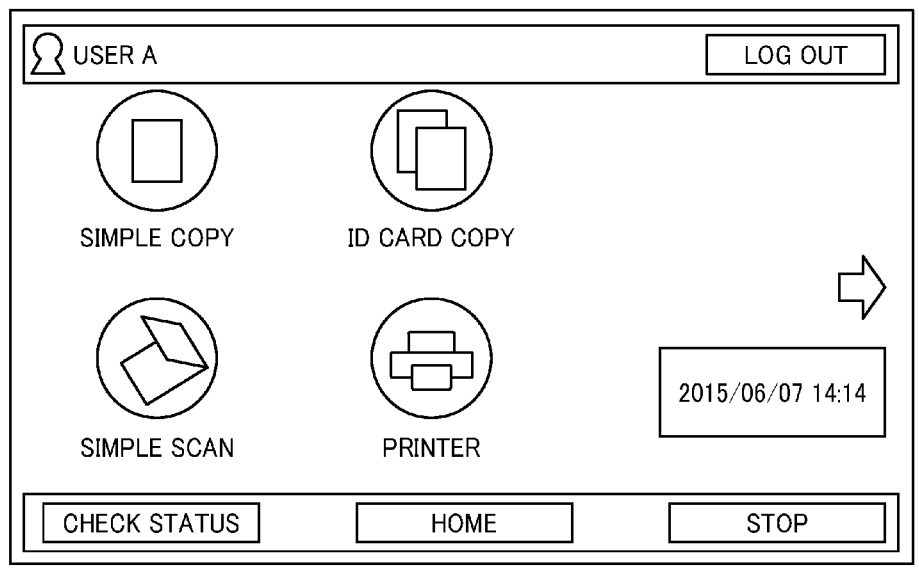
FIG. 4 is a diagram illustrating information stored in a storing unit of an operation unit as an embodiment of the present invention.
FIG. 5 is a diagram illustrating a home screen displayed on a control panel of the image forming apparatus as an embodiment of the present invention.

The storing unit 205 stores information on the app ID on the operation unit 20 registered by the identification information managing unit 204. FIG. 4 is a diagram illustrating information stored in the storing unit 205 of the operation unit 20 in this embodiment. As illustrated in FIG. 4, the storing unit 205 stores information on the app ID on the operation unit 20 as the identification information of the first application executed on the operation unit 20. For example, the storing unit 205 stores the app ID on the operation unit 20 "OAP0001". It should be noted that the app ID on the operation unit 20 is registered in the storing unit 205 each time the first application is executed on the operation unit 20. Therefore, multiple app IDs on the operation unit 20 may be stored in the storing unit 205 in some cases. Deletion of the information on the app ID on the operation unit 20 registered in the storing unit 205 is described later.

The identification information reporting unit 206 reports the identification information to the main unit 10. More specifically, in accordance with the execution of the first application by the first execution controller 202, the identification information reporting unit 206 reports the app ID on the operation unit 20 acquired by the identification information acquisition unit 203 to the main unit 10 via the connection controller 207. Here, in reporting the app ID on the operation unit 20 by the identification information reporting unit 206, a request of executing an application installed in the main unit 10 (a second application) executed in accordance with the execution of the first application is transferred to the main unit 10. It should be noted that some of the second applications are executed even if the first application is not executed. That is, not all of the first applications are executed corresponding to the second application. If only the second application is executed, that indicates that there is no corresponding first application, so the app ID on the operation unit 20 is not registered in the storing unit 205.

The connection controller 207 controls a connection between the operation unit 20 and the main unit 10 via the connection I/F 26. For example, based on the request transferred by the identification information reporting unit 206, the connection controller 207 transfers the app ID on the operation unit 20 to the main unit 10. In this case, as described above, in transferring the app ID on the operation unit 20, the request to execute the second application executed in accordance with the execution of the first application. In addition, for example, the connection controller 207 transfers a request to log in the image forming apparatus 1 and log out the image forming apparatus 1 to the main unit 10. It should be noted that various information received from the main unit 10 is described later.

The authentication processor 208 controls an authenticating operation on the image forming apparatus 1. More specifically, in case of accepting the login request and the logout request by the operation display controller 201, the authentication processor 208 performs authentication operations such as the login operation and the logout operation etc. In this embodiment, an authenticating function (i.e., the authentication processor 104 described later) in the main unit 10 practically performs the authenticating operation such as the login operation and the logout operation. After accepting the login request and the logout request, the authentication processor 208 in the operation unit 20 requests the main unit 10 to perform an operation via the connection controller 207 and reports to the application on the operation unit 20 (the first application) that the apparatus is in the login status or the logout status.

In addition, the main unit 10 includes a connection controller 101, a second execution controller 102, an execution information reporting unit 103, an authentication processor 104, and a rejection information output unit 105. All of the components or some of the components described above may be implemented by software (program) or hardware circuitry.

The connection controller 101 controls a connection between the main unit 10 and the operation unit 20 via the connection I/F 16. More specifically, the connection controller 101 receives the app ID on the operation unit 20 and the request to execute the second application etc. transferred by the operation unit 20. In addition, the connection controller 101 receives the login request and the logout request transferred by the operation unit 20. In addition, the connection controller 101 transfers a request for execution to the operation unit 20 based on a request transferred by the execution information reporting unit 103 described later. In addition, the connection controller 101 transfers a request for rejection to the operation unit 20 based on a request transferred by the rejection information reporting unit 105 described later. The execution information and the rejection information are described later in detail.

The second execution controller 102 controls executing the second application indicating the application executed by the main unit 10. More specifically, in case of receiving the app ID on the operation unit 20 and the request to execute the second application by the connection controller 101, the second execution controller 102 controls executing the second application indicating an application executed by the main unit 10.

The execution information reporting unit 103 reports the execution information including information indicating that the execution of the second application is finished and the identification information reported by the operation unit 20 to the operation unit 20. More specifically, in case of finishing executing the second application executed under control of the second execution controller 102, the execution information reporting unit 103 reports the execution information including the information indicating that the execution of the second application is finished and the app ID on the operation unit 20 accepted when the second application is executed to the operation unit 20 via the connection controller 101.

As described above, in some cases, the second application may be executed in accordance with the execution of the first application corresponding to the app ID on the operation unit 20 transferred by the operation unit 20. In that case, the app ID on the operation unit 20 is registered in the storing unit 205 in the operation unit 20. The execution information reported by the execution information reporting unit 103 is received by the connection controller 207 and passed to the identification information manager 204. As a result, if the app ID on the operation unit 20 included in the execution information is registered in the storing unit 205, the identification information managing unit 204 deletes the corresponding app ID on the operation unit 20 from the storing unit 205. That is, in accordance with the execution of the first application on the operation unit 20, after finishing executing the second application executed on the main unit 10, the identification information managing unit 204 deletes the app ID on the operation unit 20 corresponding to the first application from the storing unit 205.

The authentication processor 104 controls an authenticating operation on the image forming apparatus 1. More specifically, in case of accepting the login request and the logout request by the connection controller 101, the authentication processor 104 performs authentication operations such as the login operation and the logout operation etc. Among them, in case of performing the logout operation, if the second application currently running exists, the second application rejects the logout. If the second application rejects the logout, the user logging in the image forming apparatus 1 cannot log out the image forming apparatus 1.

If the request for logout is accepted while the second application is running, the rejection information output unit 105 outputs the rejection information indicating that the logout is rejected. More specifically, in performing the logout operation by the authentication processor 104, if the second application currently running exists, the rejection information output unit 105 outputs the rejection information indicating that the logout is rejected (i.e., the user cannot log out) to the operation unit 20 via the connection controller 101. Information indicating whether or not the user may log out is reported from each second application respectively. In this case, the second application currently running reports that the second application rejects logout. After being reported that the second application rejects logout, the rejection information output unit 105 outputs the rejection information as described above.

The rejection information output by the rejection information output unit 105 is received by the connection controller 207 and passed to the operation display controller 201. As a result, the operation display controller 201 displays first name information indicating a name of the first application corresponding to the app ID on the operation unit 20 registered in the storing unit 205 on the control panel 27. The information is displayed along with a message that the user cannot log out (an error message). As described above, in some cases, the second application may be executed in accordance with the execution of the first application corresponding to the app ID on the operation unit 20 registered in the storing unit 205. As a result, if the user cannot log out because the second application running on the main unit 10 exists, the name information of the first application corresponding to the second application along with the error message regarding logout. After searching through all applications based on the app ID on the operation unit 20, the name information displayed on the control panel 27 (e.g., the first name information) is acquired from the application whose app ID corresponds to the app ID on the operation unit 20.

However, as described above, not all of the first applications are executed corresponding to the second application. Consequently, in some cases, the app ID on the operation unit 20 may not be registered in the storing unit 205 even if the user cannot log out because the second application currently running exists. To cope with this issue, the second name information indicating the name of the second application running when the request for logout is issued is displayed on the operation unit 20, and it is possible to display the second name information along with the logout error if the app ID on the operation unit 20 is not registered in the storing unit 205. For example, if the second application currently running exists when the request for logout is issued, the rejection information output unit 105 outputs the rejection information including the second name information indicating the second application to the operation unit 20 via the connection controller 101. Subsequently, after the operation display controller 201 accepts the rejection information via the connection controller 207, if the app ID on the operation unit 20 is not registered in the storing unit 205, the operation display controller 201 displays the second name information included in the rejection information on the control panel 27 along with the logout error message. It should be noted that the second name information is acquired from each second application currently running respectively.

Next, a home screen displayed on the control panel 27 of the image forming apparatus 1 in this embodiment is described below with reference to FIG. 5. FIG. 5 is a diagram illustrating a home screen displayed on the control panel 27 of the image forming apparatus 1 in this embodiment.

As illustrated in FIG. 5, icons of applications installed in the operation unit 20 are displayed on a home screen displayed on the control panel 27. The home screen is displayed after logging in the image forming apparatus 1. An icon of an application that the user intends to use is selected by user operation. As a result, the image forming apparatus 1 performs functions of applications corresponding to the selected icon. For example, in case of selecting "simple copy", an application screen of "simple copy" is displayed. If a start button etc. is pressed after configuring various settings by user operation, a copy operation is performed. Practically, a copy function implemented in the main unit 10 is used for the copy operation.

Figure 6:
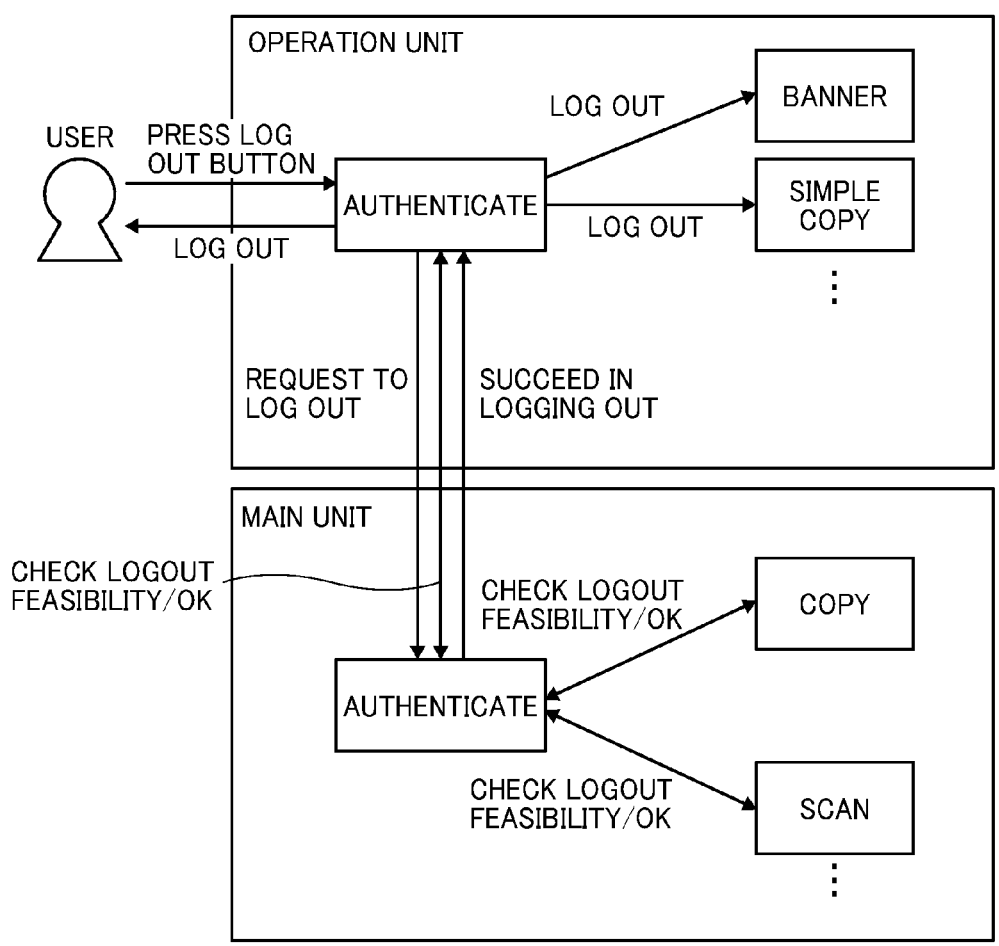
FIG. 6 is a diagram illustrating an operation of logging out in the image forming apparatus as an embodiment of the present invention.

Next, a logout operation of the image forming apparatus 1 in this embodiment is described below with reference to FIG. 6. FIG. 6 is a diagram illustrating an operation of logging out in the image forming apparatus 1 in this embodiment.

As illustrated in FIG. 6, both the operation unit 20 and the main unit 10 include the authentication function. As described above, the authentication function implemented in the main unit 10 practically performs the login operation and the logout operation. The logout button on the control panel 27 is pressed by user operation. As a result, the authentication function in the operation unit 20 recognizes that the logout operation is performed. Subsequently, the authentication function in the operation unit 20 requests the authentication function in the main unit 10 for logout. The authentication function in the main unit 10 inquires of the applications in the main unit 10 and the operation unit 20 whether or not it is possible to log out and performs logout if it is possible to log out with all applications. Subsequently, the authentication function in the main unit 10 reports to the authentication function in the operation unit 20 that logout succeeded. The authentication function in the operation unit 20 reports to the applications in the operation unit 20 that the user logs out and changes a user interface (UI). As a result, the user may recognize that the user logs out.

Figure 7:
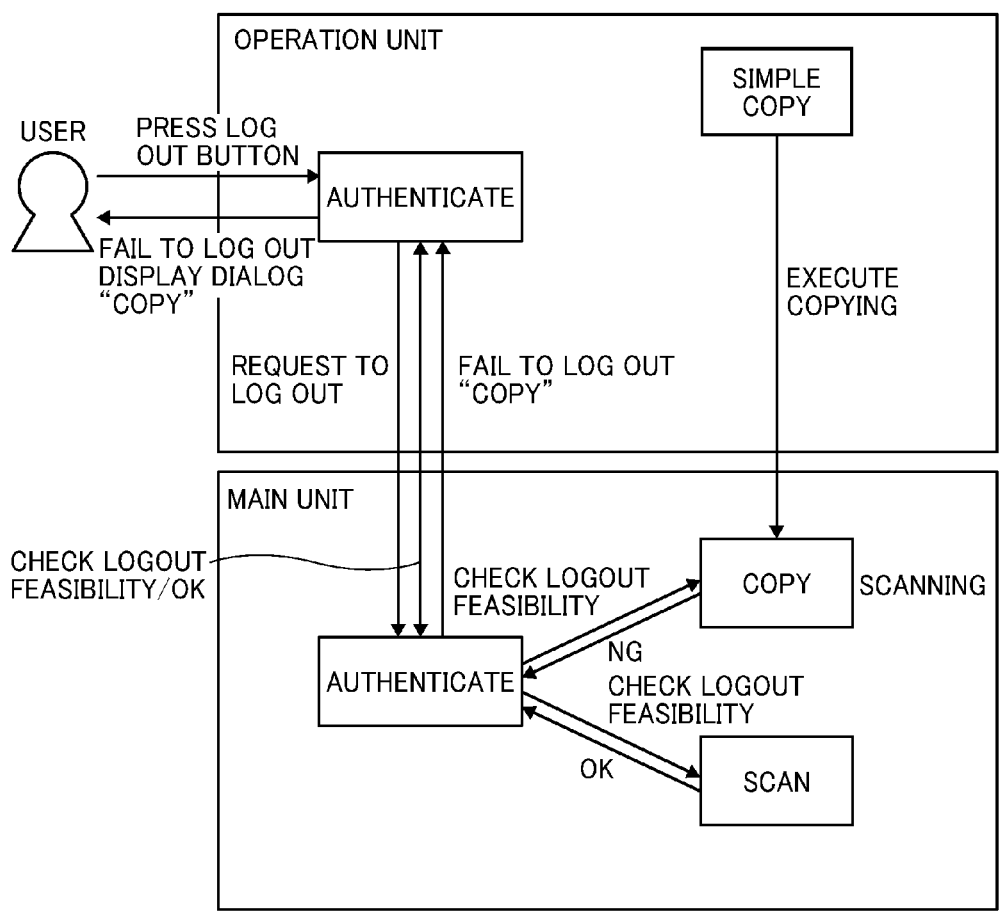
FIG. 7 is a diagram illustrating an issue that occurs when a running application rejects to log out in a known technology.

Next, an issue that occurs when a running application rejects to log out in a known technology is described below with reference to FIG. 7. FIG. 7 is a diagram illustrating an issue that occurs when a running application rejects to log out in a known technology. In FIG. 7, a case that "copy" function (currently scanning a document) rejects logout while "simple copy" function in the operation unit 20 is used is illustrated. Since the operation up to logout in FIG. 7 is similar to the operation in FIG. 6, the description for the operation is omitted.

Figure 8:
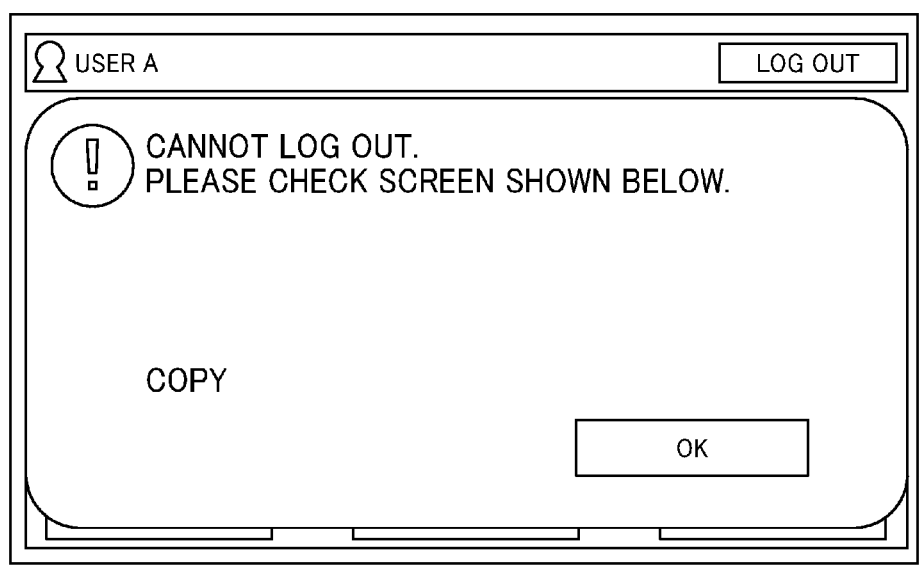
FIG. 8 is a diagram illustrating a dialog displayed when a running application rejects to log out in a known technology.

As illustrated in FIG. 7, the authentication function in the main unit 10 inquires of applications whether or not it is possible to log out. In this case, since "copy" application in main unit 10 is running, "copy" application answers that "copy" application cannot allow logout to the inquiry whether or not it is possible to log out. The authentication function in the main unit 10 reports to the authentication function in the operation unit 20 that "copy" application rejects logout. After receiving the notification, the authentication function in the operation unit 20 displays a dialog indicating that logout failed. FIG. 8 is a diagram illustrating a dialog displayed when a running application rejects to log out in a known technology. As illustrated in FIG. 8, the name information "copy" of the application in the main unit 10 is displayed along with the message that it is impossible to log out. The user recognizes that the user utilized "simple copy" function. However, in the dialog when logout failed, "copy" is displayed. For example, application "cloud FAX" in the operation unit 20 uses not "fax" function in the main unit 10 but "scan" function in the main unit 10. As a result, if logout is rejected while "cloud FAX" function is used, "scan" is displayed in the dialog. As described above, since the application name in the operation unit 20 is different from the application name in the main unit 10, it is difficult that the user recognizes the reason why the user cannot log out.

Figure 9:
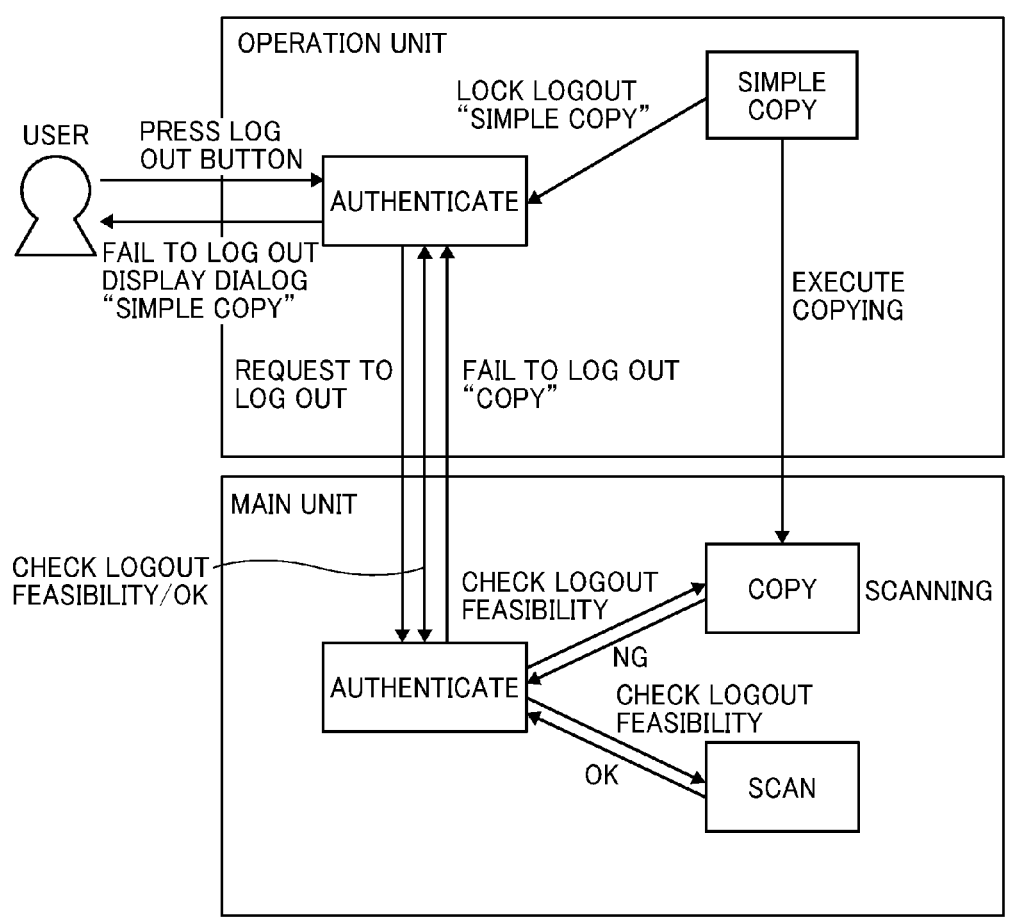
FIG. 9 is a diagram illustrating an operation of rejecting to log out performed by the running application as an embodiment of the present invention.

Next, an operation of rejecting to log out performed by the running application in this embodiment is described below with reference to FIG. 9. FIG. 9 is a diagram illustrating an operation of rejecting to log out performed by the running application in this embodiment. In FIG. 9, just like the case in FIG. 7, a case that logout is rejected while "simple copy" function in the operation unit 20 is used.

Figure 10:
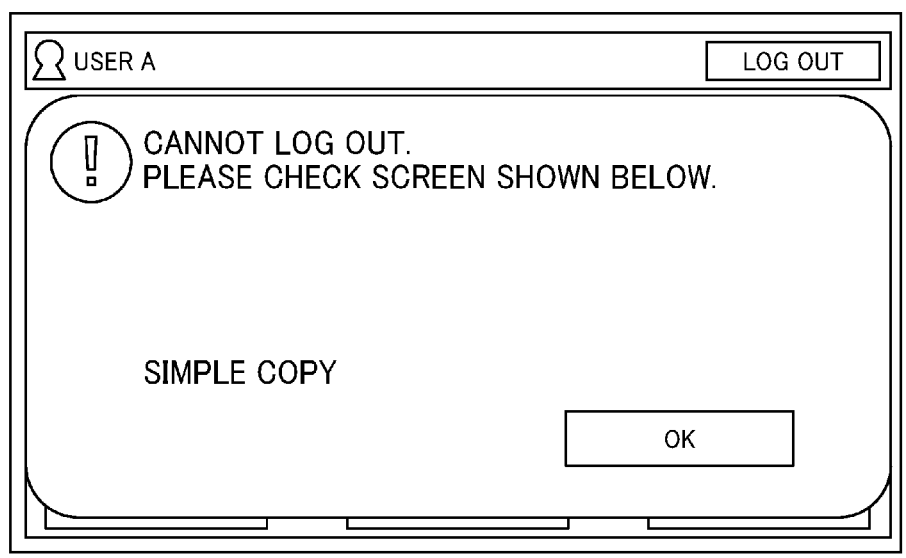
FIG. 10 is a diagram illustrating a dialog displayed by rejecting to log out by the running application as an embodiment of the present invention.

As illustrated in FIG. 9, in starting executing "simple copy" application, "simple copy" application reports its own application information (the app ID on the operation unit 20) to the authentication information in the operation unit 20. In that case, the app ID on the operation unit 20 is registered in the storing unit 205 in the operation unit 20. As a result, "simple copy" application cannot be logged out as long as its own app ID on the operation unit 20 is registered in the storing unit 205 (in FIG. 9, the symbol "logout lock" of simple copy function corresponds to that description). Operations from logging out by user operation to answering "copy" regarding the failure of logout from the main unit 10 are the same as the operation described in FIG. 7. Since the app ID on the operation unit 20 corresponding to "simple copy" application is registered in the storing unit 205, the operation unit 20 does not allow "simple copy" application to log out and displays its name "simple copy" on the dialog indicating that logout failed. FIG. 10 is a diagram illustrating a dialog displayed by rejecting to log out by the running application in this embodiment. As illustrated in FIG. 10, the name information "copy" of the application in the operation unit 20 is displayed along with the message that it is impossible to log out. As a result, the user may recognize that the reason why the user cannot log out is that "simple copy" function whose usage is recognized by the user is running.

Figure 11:
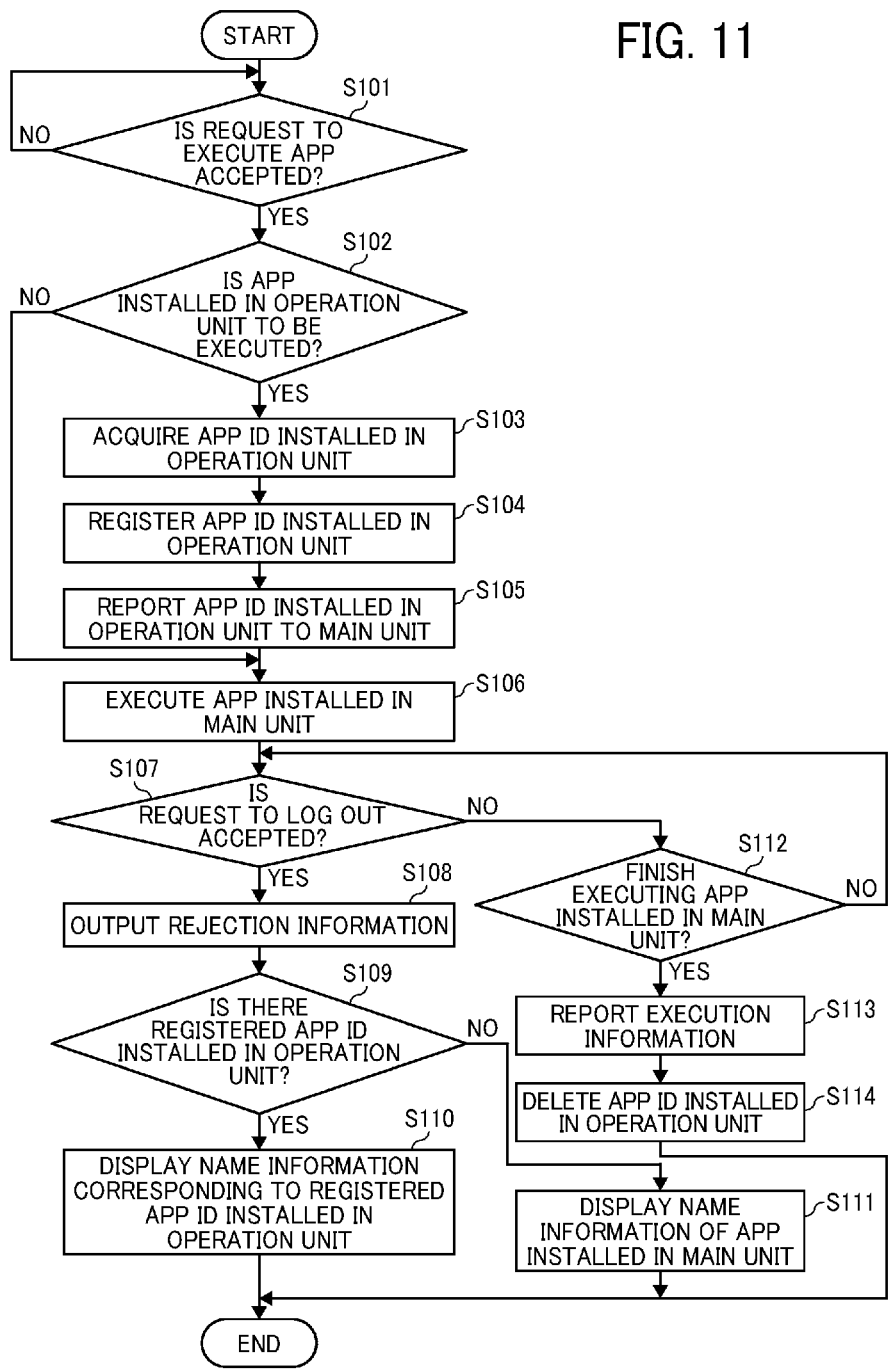
FIG. 11 is a flowchart illustrating an operation performed by the image forming apparatus as an embodiment of the present invention.

Next, a whole operation of the image forming apparatus 1 in this embodiment is described below with reference to FIG. 11. FIG. 11 is a flowchart illustrating an operation performed by the image forming apparatus in this embodiment.

As illustrated in FIG. 11, in case of accepting the request to execute the application (YES in S101), the operation unit 20 determines whether or not the application on the operation unit 20 is to be executed in S102. In addition, if the operation unit 20 does not accept the request to execute the application (NO in S101), the operation unit 20 is in the status of waiting for accepting the request to execute. In executing the application in the operation unit 20 (YES in S102), the operation unit 20 executes the first application and acquires the app ID on the operation unit 20 for identifying the first application in S103. By contrast, if the application on the operation unit 20 is not to be executed (NO in S102), a request to execute the second application is issued, and the operation proceeds to step S106.

Next, the operation unit 20 registers the acquired app ID on the operation unit 20 in the storing unit 205 in S104. Subsequently, the operation unit 20 reports the acquired app ID on the operation unit 20 along with the request to execute the second application to the main unit 10 in S105. In accordance with the request for execution from the operation unit 20, the main unit executes the second application in S106. Subsequently, via the operation unit 20, the main unit 10 determines whether or not the request for logout is accepted in S107. In this case, in case of accepting the request for logout (YES in S107), since the second application is running, the main unit 10 outputs the rejection information to the operation unit 20 in S108. In the rejection information described above, the second name information indicating the name of the second application currently running is also included.

After the main unit 10 outputs the reject information, the operation unit 20 determines whether or not the app ID on the operation unit 20 is registered in the storing unit 205 in S109. In this case, if the app ID on the operation unit 20 is registered in the storing unit 205 (YES in S109), the operation unit 20 displays the first name information indicating the name of the first application corresponding to the registered app ID on the operation unit 20 along with the message that logout failed on the control panel 27 in S110. By contrast, if the app ID on the operation unit 20 is not registered in the storing unit 205 (NO in S109), the operation unit 20 displays the second name information included in the rejection information along with the message that logout failed on the control panel 27 in S111.

If the request for logout is not accepted (NO in S107), the main unit 10 determines whether or not it is finished to execute the second application in S112. In this case, if the second application finishes executing (YES in S112), the main unit 10 reports the execution information including the app ID on the operation unit 20 to the operation unit 20 in S113. As a result, after accepting the execution information, the operation unit 20 deletes the app ID on the operation unit 20 included in the execution information from the storing unit 205 in S114. By contrast, if it is not finished to execute the second application (NO in S112), the main unit 10 executes the operation in step S107.

In accordance with the execution of the first application executed on the operation unit 20, the image forming apparatus 1 registers the app ID on the operation unit 20 for identifying the first application in the storing unit 205. While the second application on the main unit 10 executed in accordance with the execution of the first application is running, in case of accepting the request for logout, the image forming apparatus 1 displays the name information of the first application corresponding to the app ID on the operation unit 20 registered in the storing unit 205 along with the error message indicating that logout failed on the control panel 27. As a result, the image forming apparatus 1 may allow the user to recognize the reason why the user cannot log out.

Embodiment 2

The present invention may be implemented as other embodiments different from the first embodiment described above. Here, the second embodiment regarding a configuration and a program is described below.

Operations, controlling operations, specific names, and information including various data and parameters described above and illustrated in figures may be modified arbitrarily unless otherwise noted. In addition, components included in the apparatuses illustrated in figures are functional concepts, and it is unnecessary that the components are constructed physically as illustrated in figures. That is, specific embodiments of distributing apparatuses and integrating apparatuses are not limited in the embodiments illustrated in figures, and all of the apparatuses or a part of the apparatuses may be distributed or integrated functionally and physically in units of arbitrary apparatus in accordance with various obligations and availability etc.

For example, in the embodiment described above, in case of accepting the request for logout while the second application is running, the case that the name of the first application corresponding to the app ID on the operation unit 20 registered in the storing unit 205 is displayed is described. In the storing unit 205, the app ID on the operation unit 20 of the first application that is not displayed on the control panel 27 may be registered in some cases. Back ground applications such as an application installer are examples of the first application that is not displayed on the screen, and the user may not always recognize such applications. As a result, in case of registering the first application that is not displayed on the control panel 27 in the storing unit 205, screen display information indicating whether or not the application is displayed on the screen is further registered. For example, the identification information managing unit 204 registers the screen display information indicating whether or not the application is displayed by the operation unit 20 in the storing unit 205 associated with the app ID on the operation unit 20. Consequently, in displaying the error message indicating that the user cannot log out, if the screen display information is registered in the storing unit 205, the operation display controller 201 cancels displaying the name of the first application corresponding to the app ID on the operation unit 20 including the screen display information on the control panel 27.

In addition, in the first embodiment, multiple app IDs on the operation unit 20 may be registered in the storing unit 205 in some cases. In case of displaying the name of the first application corresponding to the app ID on the operation unit 20 registered in the storing unit 205, all name information may be displayed, or a dialog may be displayed in accordance with registration date/time in reverse chronological order. In addition, by comparing the name of the second application on the main unit 10 with the name of the first application on the operation unit 20, a dialog may be displayed in accordance with higher coincidence.

The program executed on the image forming apparatus 1 may be provided by being stored in a computer readable, recording medium, such as a compact disc read only memory (CD-ROM), a flexible disk (FD), a compact disc recordable (CD-R), and a digital versatile disc (DVD) etc., in a file format installable or executable. In addition, it is possible to store the program executed on the image forming apparatus 1 in the embodiments in a computer connected to a network such as the Internet etc. and provide the program by downloading the program via the network. Furthermore, it is possible to provide and distribute the program executed on the image forming apparatus 1 in the embodiments via the network such as the Internet etc. Otherwise, it is possible to provide the program executed on the image forming apparatus 1 in the embodiments by storing the program in the ROM etc. preliminarily.

The program executed on the image forming apparatus 1 has a module configuration including at least components described above (i.e., the first execution controller 202, the identification information acquisition unit 203, the identification information managing unit 204, the second execution controller 102, the rejection information output unit 105, and the operation display controller 201). Regarding the practical hardware, by reading the program from the recording medium and executing the program by the CPU, the components described above are loaded in the main storage device, and the components such as the first execution controller 202, the identification information acquisition unit 203, the identification information managing unit 204, the second execution controller 102, the rejection information output unit 105, and the operation display controller 201 are created on the main storage device.

The embodiments described above provide the information processing system that may allow the user to recognize the reason why the user cannot log out.

The present invention also encompasses an information processing method performed by an information processing system that includes a processor and a memory that stores a plurality of instructions which, when executed by one or more processors, cause the processors to perform the information processing method. The information processing method includes the steps of controlling executing a first application executed on an operation unit, the operation unit including a display, acquiring identification information for identifying the first application in accordance with execution of the first application, registering the identification information being acquired in the memory, controlling executing a second application executed on a main unit, the main unit controlling the information processing system to perform multiple functions according to an instruction input to the operation unit, outputting, in response to receiving a request to log out while the second application is executing, rejection information indicating that the request to log out is rejected, and controlling, in response to outputting the rejection information, the display of the operation unit to display first name information indicating a name of the first application corresponding to the identification information registered in the memory.

The present invention also encompasses a non-transitory recording medium storing a program that executes an information processing method, performed by an information processing system that includes a processor and a memory that stores a plurality of instructions which, when executed by one or more processors, cause the processors to perform the information processing method. The information processing method, performed by the information processing system, includes the steps of controlling executing a first application executed on an operation unit, the operation unit including a display, acquiring identification information for identifying the first application in accordance with execution of the first application, registering the identification information being acquired in the memory, controlling executing a second application executed on a main unit, the main unit controlling the information processing system to perform multiple functions according to an instruction input to the operation unit, outputting, in response to receiving a request to log out while the second application is executing, rejection information indicating that the request to log out is rejected, and controlling, in response to outputting the rejection information, the display of the operation unit to display first name information indicating a name of the first application corresponding to the identification information registered in the memory.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
a processor; and
a memory to store a plurality of instructions which, when executed by one or more processors, cause the processors to:
control executing a first application executed on an operation unit, the operation unit including a display;
acquire identification information for identifying the first application in accordance with execution of the first application;
register the identification information being acquired in the memory;
control executing a second application executed on a main unit, the main unit controlling the information processing system to perform multiple functions according to an instruction input to the operation unit;
output, in response to receiving a request to log out while the second application is executing, rejection information indicating that the request to log out is rejected; and
control, in response to outputting the rejection information, the display of the operation unit to display first name information indicating a name of the first application corresponding to the identification information registered in the memory.

2. The information processing system according to claim 1,
wherein the processor further:
reports the identification information being acquired to the main unit, the second application being executed in accordance with the execution of the first application corresponding to the identification information being reported;
reports execution information including information indicating that execution of the second application is finished and the identification information being reported to the operation unit; and
when the identification information included in the execution information being reported is registered in the memory, deletes the identification information from the memory.

3. The information processing system according to claim 1,
wherein the processor further:
outputs the rejection information including second name information indicating a name of the second application; and
controls, when the identification information is not registered in the memory, the display of the operation unit to display the second name information.

4. The information processing system according to claim 1,
wherein the processor further:
registers screen display information indicating whether or not the first application is to be displayed on the operation unit; and
controls, when the screen display information indicating that the first application is not to be displayed is registered in the memory, the display to stop displaying the first name information of the application.

5. An information processing system, comprising:
a first execution controller to control executing a first application executed on an operation unit, the operation unit including a display;
an identification information acquisition unit to acquire identification information for identifying the first application in accordance with execution of the first application;
an identification information managing unit to register the identification information being acquired in a memory;
a second execution controller to control executing a second application executed on a main unit, the main unit controlling the information processing system to perform multiple functions according to an instruction input to the operation unit;
a rejection information output unit to output, in response to receiving a request to log out while the second application is executing, rejection information indicating that the request to log out is rejected; and
a display controller to control, in response to outputting the rejection information, the display of the operation unit to display first name information indicating a name of the first application corresponding to the identification information registered in the memory.

6. An image forming apparatus, comprising:
a main unit to perform multiple functions, the main unit including first circuitry; and
an operation unit including second circuitry and a display to display a screen,
wherein the first circuitry is configured to:
   control executing a first application executed on the operation unit;
   acquire identification information for identifying the first application in accordance with execution of the first application; and
   register the identification information being acquired in a memory;
wherein the second circuitry is configured to:
   control executing a second application executed on the main unit;
   output, in response to accepting a request to log out while the second application is executing, rejection information indicating that the request to log out is rejected; and
   control, in response to outputting the rejection information, the display of the operation unit to display first name information indicating a name of the first application corresponding to the identification information registered in the memory.

\* \* \* \* \*